(12) United States Patent  
Fischer

(10) Patent No.: US 7,791,334 B2  
(45) Date of Patent: Sep. 7, 2010

(54) ROTARY ENCODER AND METHOD FOR OPERATION OF A ROTARY ENCODER

(75) Inventor: Peter Fischer, Rimsting (DE)

(73) Assignee: Dr. Johnannes Heidenhain GmbH, Traunreut (DE)

( * ) Notice: Subject to any disclaimer, the term of this patent is extended or adjusted under 35 U.S.C. 154(b) by 283 days.

(21) Appl. No.: 12/177,666

(22) Filed: Jul. 22, 2008

(65) Prior Publication Data

US 2009/0039872 A1 Feb. 12, 2009

(30) Foreign Application Priority Data

Jul. 25, 2007 (DE) .................. 10 2007 034 815  
Jun. 25, 2008 (DE) .................. 10 2008 030 201

(51) Int. Cl.  
*G01B 7/30* (2006.01)  
*G01R 33/07* (2006.01)  
*G01R 33/09* (2006.01)

(52) U.S. Cl. .................. 324/207.25; 324/207.2

(58) Field of Classification Search ......... 324/173–174, 324/207.13, 207.2, 207.24–207.25, 235, 324/251; 73/514.31, 514.39  
See application file for complete search history.

(56) References Cited

U.S. PATENT DOCUMENTS 6,084,400 A     7/2000  Steinich et al.  
7,352,174 B1 *  4/2008  Lee .................. 324/207.25  
7,598,733 B2 * 10/2009  Mehnert et al. ........ 324/207.15

FOREIGN PATENT DOCUMENTS

DE  10 2004 062 448   1/2006  
EP     0 724 712      8/1996

* cited by examiner

*Primary Examiner*—Bot L LeDynh  
(74) *Attorney, Agent, or Firm*—Kenyon & Kenyon LLP

(57) ABSTRACT

A rotary encoder includes two component groups arranged in a manner allowing rotation relative to each other about an axis, the first component group having a triggering sensor and a plurality of magnetic sensors. The second component group includes a first magnet, a second magnet, and a third magnet. The component groups are configured such that, in response to a full revolution, the magnetic field of the first magnet and of the third magnet are detectable by the magnetic sensors. A trigger signal is able to be generated by the triggering sensor due to the second magnet and the third magnet, while the first magnet does not bring about a triggering of a trigger signal by the trigger sensor.

22 Claims, 8 Drawing Sheets $n = 1$  
$v = 0°$  
$S1.3_1 = 0$  
$S1.4_1 = 1$ n = 1
v = 0°
S1.3₁ = 0
S1.4₁ = 1

$n = 2$
$v \approx 60°$
$S1.3_2 = 1$
$S1.4_2 = 1$ $n = 3$
$v \approx 180°$
$S1.3_3 = 0$
$S1.4_3 = 1$

ROTARY ENCODER AND METHOD FOR OPERATION OF A ROTARY ENCODER

CROSS-REFERENCE TO RELATED APPLICATIONS

The present application claims priority to Application No. 10 2007 034 815.2, filed in the Federal Republic of Germany on Jul. 25, 2007, and to Application No. 10 2008 030 201.5, filed in the Federal Republic of Germany on Jun. 25, 2008, each of which is expressly incorporated herein in its entirety by reference thereto.

FIELD OF THE INVENTION

The present invention relates to rotary encoders and to methods for operation of rotary encoders.

BACKGROUND INFORMATION

Rotary encoders are frequently used for determining the angular position of two machine parts rotatable relative to each other. Often, such rotary encoders are employed as measuring devices for determining the absolute angular position over multiple revolutions (multiturn function) of corresponding drive shafts. In so doing, the rotary motion is recorded incrementally or absolutely. In connection with gear racks and gear wheels or with threaded spindles, linear motions can also be measured by an angular position encoder.

During normal operation, often the angular position is exactly determined by optical scanning of a graduated disk, while a magnetic scanning principle is used for counting the revolutions of the drive shaft. In general, it is desirable that the revolutions of corresponding drive shafts also are counted when the rotary encoder is not connected to an external voltage source, e.g., when the power supply is interrupted. To achieve this functionality with respect to an emergency operation, rotary encoders are frequently equipped with what are referred to as multiturn gear units. Multiturn gear units of this kind reduce the rotary motion of the drive shaft. For example, the position of a gear wheel in the multiturn gear unit may then be scanned using a magnetic measuring principle. The rotary motion of the corresponding gear wheel also takes place when the power supply of the rotary encoder is interrupted, e.g., when the drive shaft moves due to gravitational forces.

German Published Patent Application No. 10 2004 062 448 describes a rotary encoder in which a plurality of magnetic-pole segments are disposed over the periphery of a shaft. Upon leading the magnetic-pole segments past the free ends of flux concentrators, a sudden magnetic reversal of a ferromagnetic element takes place, thereby making sufficient electrical energy available for activating a memorizing counter.

Moreover, European Published Patent Application No. 0 724 712 describes an angle-of-rotation sensor by which an angular position can be determined in energy-autonomous manner utilizing a plurality of pulse wires and by the use of logic operations.

Such conventional rotary encoders have the disadvantage, for example, that they are only able to be produced with a comparative degree of complexity, and are costly to manufacture.

SUMMARY

Example embodiments of the present invention provide a rotary encoder which, as a result of its configuration and its operating principle, is comparatively cost-effective to produce.

A rotary encoder according to example embodiments of the present invention include a first component group, e.g., a stator, and a second component group, for example, a rotor, the component groups being arranged in a manner allowing rotation relative to each other about an axis. The first component group has a triggering sensor, for example, a pulse wire having a reset magnet, as well as a plurality of magnetic sensors which are staggered in the circumferential direction relative to the axis. The second component group includes at least a first magnet, a second magnet and a third magnet. In addition, the component groups are configured such that, in response to a relative rotation of the two components by at least one full revolution, the respective magnetic field of the first magnet and of the third magnet is detectable by the magnetic sensors, in each instance a trigger signal being able to be generated by the triggering sensor due to the second magnet and the third magnet, while the first magnet does not bring about a triggering of the trigger signal by the triggering sensor.

A full revolution means a relative change of the rotational position of the component groups of 360°, that is, given one full revolution, for example, one point of the rotor lies opposite one point of the stator both at the beginning of the rotary motion and at the end of the rotary motion. The second component group may have a shaft, e.g., a hollow shaft having a central bore hole.

A magnetically sensitive, unipolar element, e.g., a pulse wire or a Hall element may be used as triggering sensors.

The magnetic fields are always detected when a magnet is in the vicinity of a magnetic sensor, i.e., when the effective width or breadth of a magnet is in the area of a magnetic sensor. A trigger signal is triggered when, as a result of the relative rotary motion, a suitable magnet approaches the triggering sensor in question, that is, when the magnet and the triggering sensor are opposite each other within a triggering area.

The subassemblies may also be configured such that, in response to a relative rotation of the two components by at least one full revolution, the magnetic field of the second magnet is also detectable by the magnetic sensors.

The magnetic sensors, which, e.g., may be in the form of MR elements or Hall elements, may be omnipolar-sensitive. That is, the magnetic sensors react to magnetic fields, regardless of the direction of the magnetic field in question.

The triggering sensor may include a pulse wire and a reset magnet. The reset magnet is oriented such that it has a directional component parallel to the longitudinal extension of the pulse wire. Moreover, the component groups are configured so that, due to the second magnet and due to the third magnet, a voltage pulse is able to be generated by the pulse wire as trigger signal, while the first magnet does not bring about a triggering of a voltage pulse by the pulse wire.

In this context, the reset magnet, e.g., its polar alignment, is oriented such that it has a directional component parallel to the longitudinal extension of the pulse wire.

The reset magnet thus has a polar alignment having a directional component parallel to the longitudinal extension of the pulse wire. Accordingly, in this context, oriented refers to the polar alignment representing the direction of the connecting line between the magnet poles.

The pulse wire may be disposed with a directional component parallel to the axis. This is especially advantageous when the second and/or third magnets are disposed on the housing or lateral side of the second component group of the rotary encoder. In this case, the second component group may have a hollow shaft having a central bore hole.

Example embodiments of the present invention also include rotary encoders in which radially aligned second and third magnets are provided on the second component group. In this case, the pulse wire may be radially aligned, as well. The first magnet may also be secured radially to the second component group.

The polar alignments of the second magnet and of the third magnet may be oriented with a directional component parallel to the axis, while that of the first magnet is oriented with a directional component antiparallel to the axis. That is, the first magnet may be magnetized substantially anti-polar compared to the second and third magnets. Moreover, the reset magnet and the first magnet may be oriented such that their polar alignments are parallel.

The rotary encoder may include two first, two second and two third magnets, e.g., first, second and third groups of magnets. The rotary encoder may include, e.g., four first, four second and four third magnets.

The rotary encoder may also be implemented so that one element of the second component group, e.g., a shaft, is locally magnetized directly with the suitable polar alignment in each case, so that there are thus no separate magnets.

The rotary encoder may include an electronic circuit and a non-volatile memory element. In this regard, four edge states and a counter content may be stored in the memory element. In response to a later occurrence of a trigger signal, the memory contents are able to be read out from the memory element, so that with the aid of the electronic circuit, the direction of rotation of the component groups relative to each other is determinable, and a counting pulse is able to be generated by the electronic circuit. Based on the direction of rotation and the occurrence of the counting pulse, a change in the counter content is thus able to be stored in the memory element.

Edge states are states which are derived from the respective states of the magnetic sensors, and are defined by mathematical interrelationships of propositional logic. Various types of edge states may be defined, depending on the various types of magnets, e.g., the first, second and third magnets.

The third magnet may have a larger effective width than a respective effective width of the first magnet or the second magnet. Hereinafter, an effective width should be understood to refer to an arc length or an angle. When a magnet is within the area of the effective width with respect to a magnetic sensor or the triggering sensor, the magnet is able to trigger a reaction of the magnetic sensor or of the triggering sensor, e.g., a trigger signal. Outside of the effective width, no reaction of the magnetic sensor or of the triggering sensor is able to be triggered by the magnet in question.

Trigger areas may be configured such that their borders occur offset with respect to the edges of the states of the magnetic sensors. Hereinafter, a trigger area should be understood to refer to an arc length or an angle. When a magnet is located within the trigger area with respect to the triggering sensor, the magnet is able to trigger a trigger signal in the triggering sensor. Outside of the trigger area, no trigger signal of the triggering sensor is able to be triggered by the magnet in question.

The effective width of the second magnet may be as large as its trigger area, and alternatively or additionally, the effective width of the third magnet may be as large as its trigger area.

The first magnet may be staggered in the circumferential direction by a first angle relative to the second magnet, the second magnet may be staggered in the circumferential direction by a second angle relative to the third magnet, and the two angles may be of different size.

Furthermore, the rotary encoder may be implemented such that, in response to a relative rotation of the two components by a full revolution without overlap of the starting point and end point, j counting pulses are able to be generated. The first angle may be $95°/j\pm20°/j$ or $360°/j-95°/j\pm20°/j$, e.g., $95°/j\pm10°/j$ or $360°/j-95°/j\pm10°/j$. The second angle may be $133°/j\pm20°/j$ or $360°/j-133°/j\pm200/j$, e.g., $133°/j\pm10°/j$ or $360°/j-133°/j\pm10°/j$.

The triggering sensor may be staggered in the circumferential direction by an angle of $133°/j\pm20°/j$ or of $360°/j-133°/j\pm20°/j$, e.g., by an angle of $133°/j\pm10°/j$ or of $360°/j-133°/j\pm10°/j$ with respect to one of the magnetic sensors. Moreover, the magnetic sensors may be staggered in the circumferential direction by a further angle of $(38°\pm10°)/j$ or of $360°/j-(38°\pm10°)/j$ with respect to a triggering sensor.

According to example embodiments of the present invention, a method is provided for operating a rotary encoder, which includes a first component group and a second component group, the component groups being disposed in a manner allowing rotation relative to each other about an axis. The first component group has a triggering sensor, for example, a pulse wire having a reset magnet, as well as a plurality of magnetic sensors which are staggered in the circumferential direction relative to the axis. The second component group includes at least a first magnet, a second magnet and a third magnet. In addition, the component groups are configured such that, in response to a relative rotation of the two components by at least one full revolution, the magnetic field of the first magnet and of the third magnet is detected by the magnetic sensors. Moreover, due to the second magnet and the third magnet, a trigger signal of the triggering sensor, for example, a voltage pulse of the pulse wire is generated, while the first magnet does not bring about generation of the trigger signal by the triggering sensor.

Initially four edge states and a counter content may be stored in a non-volatile memory element. In response to a later occurrence of a voltage pulse or trigger signal, these memory contents, particularly the edge states, are read out from the memory element. Thereupon, based on, e.g., on the memory contents, the direction of rotation of the component groups relative to each other is determined by an electronic circuit. A counting pulse is generated in the circuit, so that based on the direction of rotation and the counting pulse, a change in the counter content is stored in the memory element.

Two counting pulses are generated in response to one revolution of the two components relative to each other, that is, in response to one revolution without overlap of the starting point and end point, which thus ends just prior to reaching the starting position.

For use in emergency operation of the rotary encoder, it may be provided that the energy content of the voltage pulse is used for generating a counting pulse and for storing a counter content in a non-volatile memory element. In this connection, a memory element may be used which is based on devices having ferroelectric properties. Memory elements of this kind require relatively little electrical energy, and are often referred to as FeRAM or FRAM. Alternatively, what is referred to as an MRAM may also be used for this purpose. In any case, memory elements that are writable as often as desired may be provided.

Alternatively or additionally, the voltage pulse of the pulse wire may also be used for switching in a supply voltage, for example, a battery.

Further details and aspects of the rotary encoder and of the method are described in more detail below with reference to the appended Figures.

DETAILED DESCRIPTION

Figure 1:
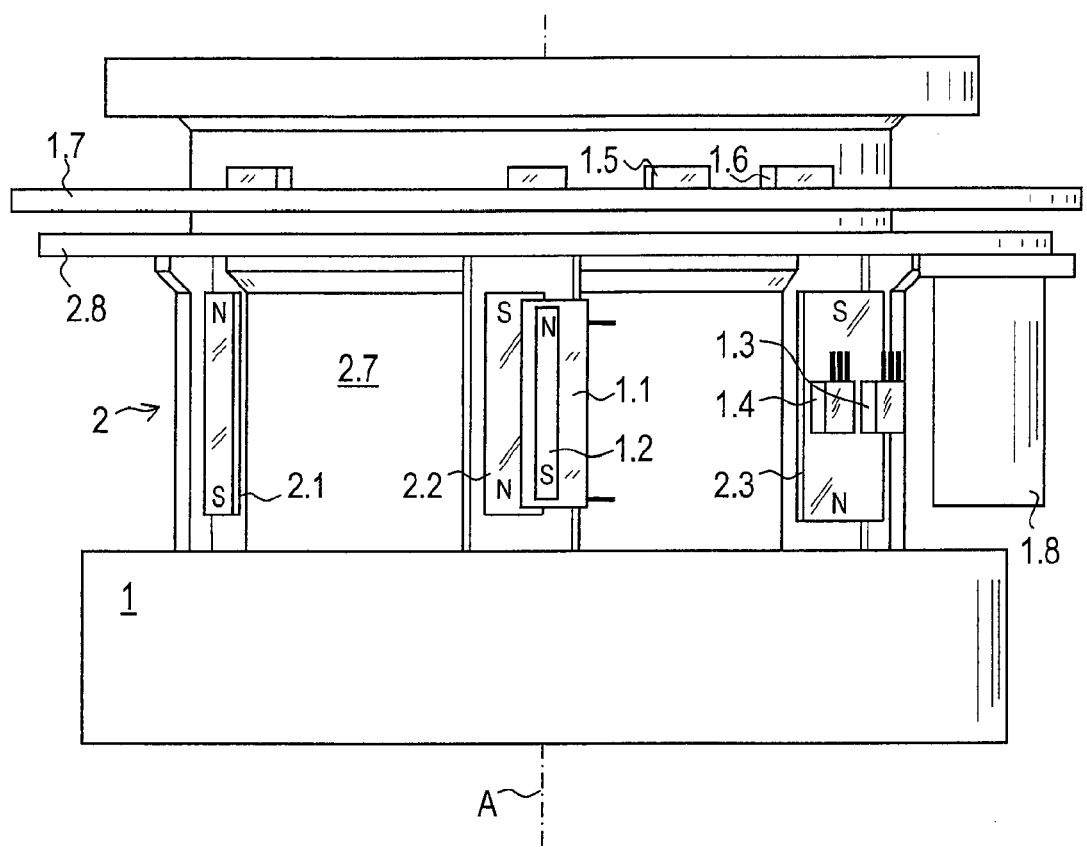
FIG. 1 is a side view of a part of a rotary encoder according to an example embodiment of the present invention.

FIG. 1 shows a part of a rotary encoder according to an example embodiment of the present invention. The rotary encoder has a first component group, which in the exemplary embodiment illustrated, is used as stator 1. As a second component group, a rotor 2 is arranged in a manner allowing rotation about an axis A as against stator 1.

Stator 1 includes a pulse wire 1.1 or Wiegand sensor as a triggering sensor, which is formed of a special alloy having a magnetically hard metal as sheath and a magnetically soft metal as core. As soon as an external magnetic field exceeds a specific field intensity, a sudden magnetic reversal of the core takes place, a voltage pulse thereby being induced in a coil of pulse wire 1.1, i.e., pulse wire 1.1 triggers a voltage pulse.

A reset magnet 1.2 is arranged parallel to the longitudinal extension of pulse wire 1.1. Reset magnet 1.2 is sufficiently strong that as soon as an external magnetic field with corresponding polarity moves away again from pulse wire 1.1, the presence of reset magnet 1.2 triggers a reset of pulse wire 1.1.

Stator 1 also includes two magnetic sensors in the form of MR elements 1.3, 1.4. MR elements 1.3, 1.4 are omnipolar-sensitive, e.g., they react to magnetic fields regardless of their polarity.

The respective states S1.3, S1.4 of MR elements 1.3, 1.4 are supplied to a circuit, e.g., an ASIC module 1.5, which evaluates them. ASIC module 1.5 is mounted on a printed circuit board 1.7 which is joined in rotatably fixed manner to the stator. Printed circuit board 1.7 includes, e.g., a non-volatile memory element which, in the exemplary embodiment illustrated, is in the form of a FeRAM memory element 1.6.

During normal operation, the rotary encoder operates according to an optical principle. For this reason, arranged on stator 1 is an opto-electronic sensor unit 1.8 which includes, e.g., a light source and photodetectors.

During normal operation, a graduated disk 2.8, which is joined in rotatably fixed manner to a hollow shaft 2.7 of rotor 2 and is therefore rotatable relative to stator 1, is able to be scanned by opto-electronic sensor unit 1.8 using the incident light technique, in order to determine the exact relative angular position between stator 1 and rotor 2. Hollow shaft 2.7 is used for the rotatably-fixed accommodation of a motor shaft, whose rotary motion is to be recorded by the rotary encoder.

In addition to graduated disk 2.8, rotor 2 has a plurality of magnets, which may be divided into three groups according to their function. The two passive magnets 2.1, 2.4 represent the first group (see also FIGS. 2a to 2c). Passive magnets 2.1, 2.4 are secured to rotor 2 on the housing or lateral side parallel to axis A, the poles being staggered relative to axis A, e.g., the connecting lines of the poles are oriented parallel to axis A. In this context, the north pole of passive magnets 2.1, 2.4 is located at the top in FIG. 1, as is also the case for reset magnet 1.2. Accordingly, reset magnet 1.2 and passive magnets 2.1, 2.4 are oriented such that their polar alignments are parallel.

What are referred to as magnetic counters 2.2, 2.5 are arranged as the second group of magnets on rotor 2. In addition, auxiliary magnets 2.3, 2.6 are secured as the third group of magnets to rotor 2. The polar alignments of magnetic counters 2.2, 2.5 and auxiliary magnets 2.3, 2.6 are identical and magnetically antiparallel or opposite to the polar alignment of passive magnets 2.1, 2.4. In accordance with their polar alignment, due to magnetic counters 2.2, 2.5 and auxiliary magnets 2.3, 2.6, a voltage pulse is able to be generated by pulse wire 1.1, while passive magnets 2.1, 2.4 do not bring about a triggering of a voltage pulse by pulse wire 1.1, because their polar alignment is not capable of activating pulse wire 1.1—reset by reset magnet 1.2—such that it would generate a voltage pulse.

On the other hand, the magnetic fields of passive magnets 2.1, 2.4, magnetic counters 2.2, 2.5 and auxiliary magnets 2.3, 2.6 are all detectable by omnipolar-sensitive MR elements 1.3, 1.4. In other words, these magnetic fields are able to change states S1.3, S1.4 of MR elements 1.3, 1.4.

If, because of a power failure, for example, the rotary encoder is taken out of its normal operation, it is automatically shifted to an emergency-operation mode. In this emergency-operation mode, what matters is merely that individual revolutions be counted and stored, so that upon resumption of normal operation, the exact rotational position of hollow shaft 2.7 may be determined immediately, taking the revolutions which took place in the emergency operation mode into account. In the exemplary embodiment illustrated, two counting pulses are generated per revolution of hollow shaft 2.7, so that quasi half revolutions are counted.

The functioning method of the rotary encoder in emergency operation mode is explained with reference to FIGS. 2a to 2c and Tables I through III. In this context, it is assumed that rotor 2 is continuously rotating counter-clockwise relative to stator 1. The views of FIGS. 2*a* to 2*c* correspond largely to a sectional view of FIG. 1, the cross-sectional views being observed from above. Accordingly, the south poles of magnetic counters 2.2, 2.5 and auxiliary magnets 2.3, 2.6 are arranged in the drawing plane, while in the case of passive magnets 2.1, 2.4, the north pole comes is arranged in the drawing plane.

Figure 2A:
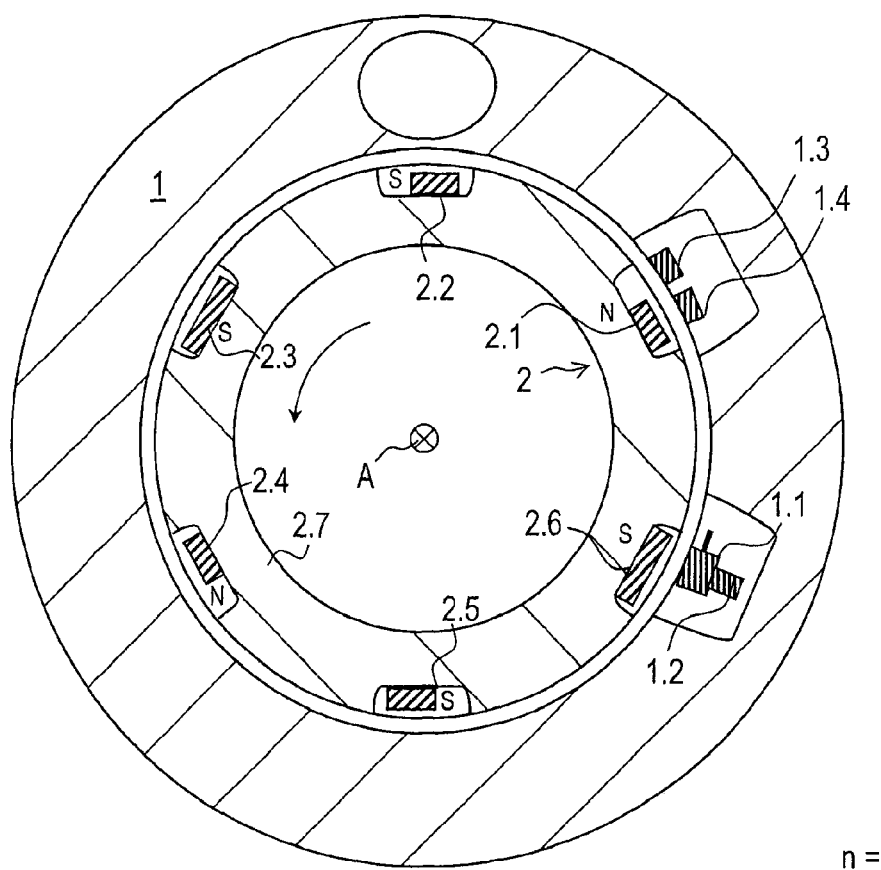
FIG. 2a is a cross-sectional view through a part of the rotary encoder in a first rotational position.

In FIG. 2*a*, rotor 2 is shown in a first rotational position with angle v=0°, in which auxiliary magnet 2.6 is located in the vicinity of pulse wire 1.1. Due to the approach of auxiliary magnet 2.6 and its polar alignment, a voltage pulse is triggered by pulse wire 1.1. Hereinafter, the ordinal number 1 is assigned to this event, that is, by definition, the first voltage pulse is triggered in FIG. 2*a*, and thus running index n is set to 1. In addition, in the rotational position illustrated in FIG. 2*a*, one passive magnet 2.1 is opposite second magnetic sensor 1.4, while first magnetic sensor 1.3 detects no magnetic field. Since magnetic sensors 1.3, 1.4 are omnipolar-sensitive, in principle, they also react to the magnetic fields of passive magnets 2.1, 2.4. Therefore, in the present rotational position, magnetic sensor 1.4 delivers a signal.

$S1.3_n=S1.3_1=0$ and $S1.4_n=S1.4_1=1$.

After rotor 2 has reached the rotational position having angle v=0°, no counting pulse P is triggered, so that $P_1=0$ applies. In addition, what are referred to as auxiliary-magnet edge states $F1_n$, $F2_n$ are set to the values $F1_1=0$ and $F2_1=1$.

Furthermore, magnetic-counter edge states $Z1_n$, $Z2_n$ assume the values $Z1_1=0$ and $Z2_1=1$.

The values for counting pulse $P_1$, auxiliary-magnet edge states $F1_n$, $F2_n$ and for magnetic-counter edge states $Z1_n$, $Z2_n$ result from the previous states n−1, as explained below.

The values of $F1_1$, $F2_1$, $Z1_1$, $Z2_1$ are formed in ASIC module 1.5, and are stored in FeRAM memory element 1.6. Since in position n=1 (v≈0°), the state of the counting pulse is $P_1=0$, the counter content is left unchanged in the memory element. No electrical energy is supplied from outside for the entire operation, including the storage in FeRAM memory element 1.6. The energy content of the voltage pulse is used for powering the electronic elements, so that the rotary encoder operates energy-autonomously in emergency operation. Various types of edge states, e.g., magnetic-counter edge state $Z1_n$, $Z2_n$, auxiliary-magnet edge state $F1_n$, $F2_n$, are able to be defined in accordance with the various types of magnets, e.g., magnetic counters 2.2, 2.5 and auxiliary magnets 2.3, 2.6.

When rotor 2 rotates further counter-clockwise, auxiliary magnet 2.6 moves away from pulse wire 1.1 and its domains are completely folded back by reset magnet 1.2, so that a following triggering of a voltage pulse is basically only possible due to one of magnetic counters 2.2, 2.5 or one of auxiliary magnets 2.3, 2.6.

Figure 2B:
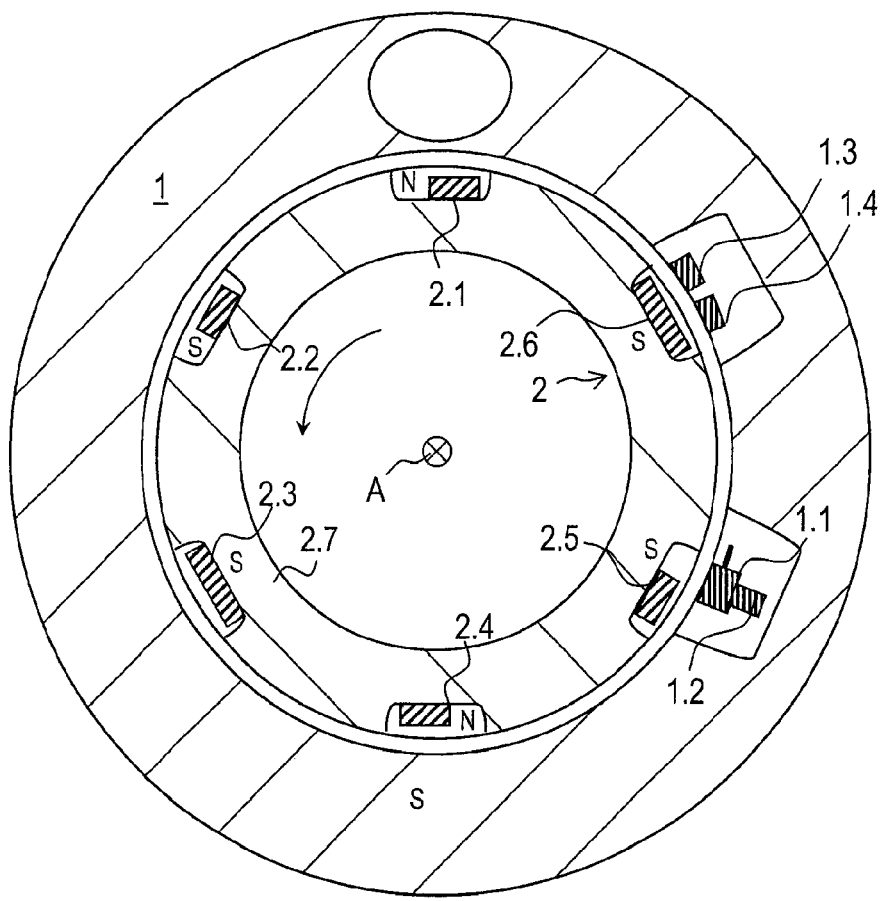
FIG. 2b is a cross-sectional view through a part of the rotary encoder in a second rotational position.

This case is illustrated in FIG. 2*b*, rotor 2 being rotated by approximately 60° compared to the rotational position according to FIG. 2*a*. Due to magnetic counter 2.5, whose polar alignment is oriented parallel to that of auxiliary magnet 2.6, a second voltage pulse is triggered by pulse wire 1.1, so that n=2 may thus be set. Accordingly, a logic query is started again in ASIC module 1.5. Since both magnetic sensors 1.3, 1.4 are situated opposite auxiliary magnet 2.6, magnetic sensor 1.3 and magnetic sensor 1.4 are shifted into the states $S1.3_2=1$ and $S1.4_2=1$.

With the aid of Table III, it may first of all be ascertained whether or not a counting pulse must be triggered, and whether a determination of the direction of rotation is possible in this state. After the states $S1.3_2=1$ and $S1.4_2=1$ of magnetic sensors 1.3, 1.4 are known, and furthermore, $Z1_1=0$, $Z2_1=1$, and $F1_1=0$, $F2_1=1$, $P_2=1$ is obtained. Thus, for the present example, the eleventh line from the bottom of Table III applies (see emphasis by ellipse), so that it is thus clearly determined that rotor 2 is rotating counter-clockwise (column R=ccw, e.g., counter-clockwise) and a counting pulse must take place (column P=1). The counting pulse is relayed within ASIC module 1.5 to a counting circuit. The instantaneous counter content is thereupon transferred from ASIC module 1.5 to FeRAM memory element 1.6 and stored there.

Given the condition P=1, the counter content is increased or reduced by one increment according to the direction of rotation determined.

With the knowledge that $P_2=1$, it is possible to ascertain the instantaneous values for auxiliary-magnet edge states $F1_2$, $F2_2$ from Table I for the treatment of the next triggering event of a voltage pulse (see emphasis by ellipse):

$P_2=1$; $S1.3_2=1$, $S1.4_2=1$; $F1_1=0$, $F2_1=1 \Rightarrow F1_2=0$, $F2_2=0$ Using Table II, the instantaneous values of magnetic-counter edge states $Z1_2$, $Z2_2$ may be determined (see emphasis by ellipse):

$S1.3_2=1$, $S1.4_2=1$; $Z1_1=0$, $Z2_1=1 \Rightarrow Z1_2=0$, $Z2_2=1$

Quite generally, the values of $F1_n$, $F2_n$, $Z1_n$, $Z2_n$ are determined in ASIC module 1.5 for all rotational positions and directions of rotation by checking the following conditions according to the rules of propositional logic:

$F1_n=(invP \wedge F1_{n-1} \wedge invF2_{n-1}) \vee (invS1.3_n \wedge invS1.4_n \wedge invF1_{n-1} \wedge invF2_{n-1}) \vee (invP \wedge invS1.3_n \wedge invS1.4_n \wedge F1_{n-1})$ $F2_n=(invP \wedge invF1_{n-1} \wedge F2_{n-1}) \vee (invS1.3_n \wedge S1.4_n \wedge invF1_{n-1} \wedge invF2_{n-1}) \vee (invP \wedge invS1.3_n \wedge S1.4_n \wedge F2_{n-1})$ $Z1_n=(S1.3_n \wedge invS1.4_n) \vee (invS1.3_n \wedge Z1_{n-1} \wedge inv Z2_{n-1})$ $Z2_n=(S1.3_n \wedge S1.4_n) \vee (invS1.3_n \wedge invZ1_{n-1} \wedge Z2_{n-1})$ $cw=(S1.3_n \wedge invS1.4_n \wedge invZ1_{n-1} \wedge Z2_{n-1} \wedge invF1_{n-1} \wedge invF2_{n-1}) \vee (S1.3_n \wedge invS1.4_n \wedge invZ1_{n-1} \wedge Z2_{n-1} \wedge invF1_{n-1} \wedge F2_{n-1}) \vee (S1.3_n \wedge invS1.4_n \wedge invZ1_{n-1} \wedge Z2_{n-1} \wedge F1_{n-1} \wedge invF2_{n-1}) \vee (S1.3_n \wedge invS1.4_n \wedge invZ1_{n-1} \wedge Z2_{n-1} \wedge F1_{n-1} \wedge invF2_{n-1}) \vee (invS1.3_n \wedge invS1.4_n \wedge invZ1_{n-1} \wedge Z2_{n-1} \wedge invF1_{n-1} \wedge invF2_{n-1}) \vee (S1.3_n \wedge invS1.4_n \wedge Z1_{n-1} \wedge invZ2_{n-1} \wedge invF1_{n-1} \wedge F2_{n-1})$ $ccw=(S1.3_n \wedge S1.4_n \wedge invZ1_{n-1} \wedge Z2_{n-1} \wedge invF1_{n-1} \wedge F2_{n-1}) \vee (S1.3_n \wedge S1.4_n \wedge Z1_{n-1} \wedge invZ2_{n-1} \wedge invF1_{n-1} \wedge invF2_{n-1}) \vee (S1.3_n \wedge S1.4_n \wedge Z1_{n-1} \wedge invZ2_{n-1} \wedge invF1_{n-1} \wedge F2_{n-1}) \vee (S1.3_n \wedge S1.4_n \wedge Z1_{n-1} \wedge invZ2_{n-1} \wedge F1_{n-1} \wedge invF2_{n-1}) \vee (S1.3_n \wedge S1.4_n \wedge Z1_{n-1} \wedge invZ2_{n-1} \wedge F1_{n-1} \wedge invF2_{n-1}) \vee (S1.3_n \wedge S1.4_n \wedge invZ1_{n-1} \wedge Z2_{n-1} \wedge F1_{n-1} \wedge invF2_{n-1})$ $P=ccw \vee cw$ If rotor 2 continues to rotate counter-clockwise, passive magnet 2.4 initially passes pulse wire 1.1. However, this triggers no voltage pulse, because passive magnet 2.4 is magnetized antiparallel to magnetic counters 2.2, 2.5 and auxiliary magnets 2.3, 2.6. If no voltage pulse occurs, no logic query is begun and the values already stored remain unchanged in FeRAM memory element 1.6.

Figure 2C:
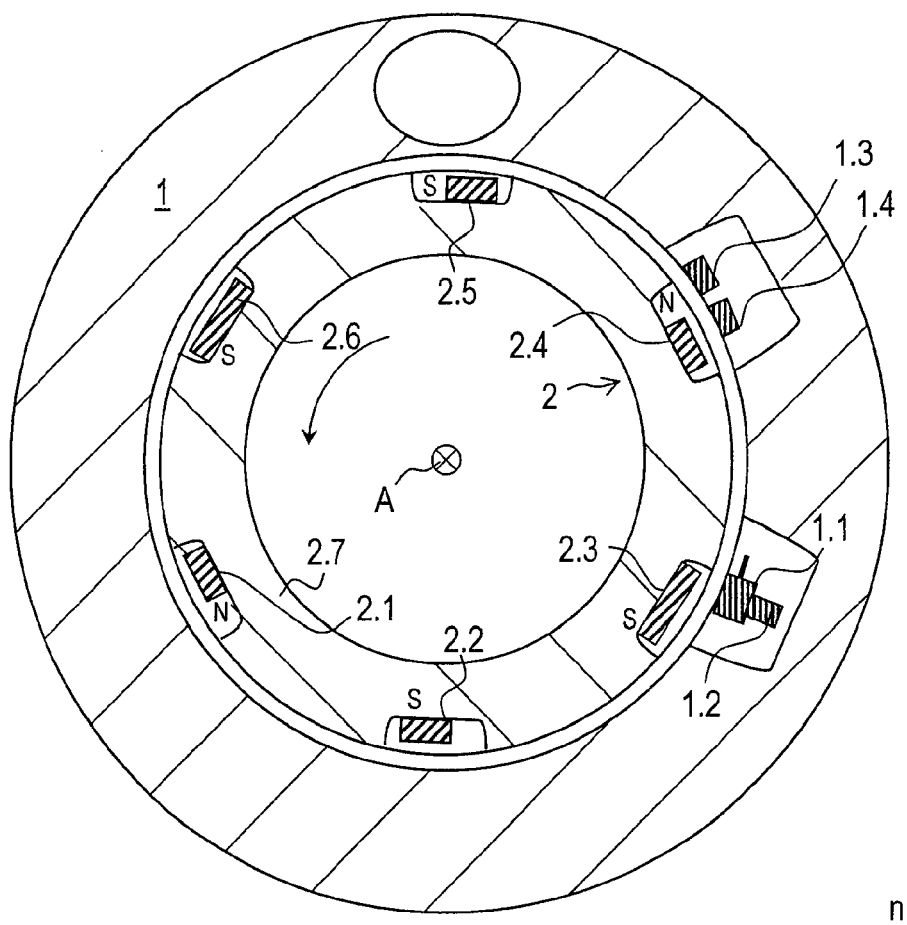
FIG. 2c is a cross-sectional view through a part of the rotary encoder in a third rotational position.

The next voltage pulse is first triggered in a rotational position according to FIG. 2c, where v≈180°, so that n=3. The logic of ASIC component 1.5 queries the respective state of magnetic sensors 1.3, 1.4, where given n=3

$S1.3_3=0$, $S1.4_3=1$ applies. It is initially checked again according to Table III whether a counting pulse is triggered, thus the value is determined for $P_3$.

Since $Z1_2=0$, $Z2_2=1$ and $F1_2=0$, $F2_2=0$, according to the conditions of propositional logic, i.e. from Table III, it follows that:

$P_3=0$.

Accordingly, no counting pulse is triggered, and the question of the direction of rotation is therefore unfounded. The counter content in FeRAM memory element 1.6 therefore remains unchanged.

After that, according to Table I $F1_3=0$, $F2_3=1$ are set.

With the aid of Table II, $Z1_3=0$, $Z2_3=1$ are determined. Thus, FeRAM memory element 1.6 stores the values for $F1_n$, $F2_n$, $Z1_n$, $Z2_n$ and the instantaneous counter content.

In the exemplary embodiment described, a continuous, uniform movement is considered. In order for suitable values to already be available for magnetic-counter edge states $Z1_{n-1}$, $Z2_{n-1}$ and for auxiliary-magnet edge states $F1_{n-1}$, $F2_{n-1}$ when putting the rotary encoder into operation, corresponding default values are stored as start values in FeRAM memory element 1.6.

Using the method for operating the rotary encoder, an unequivocal count of revolutions may be performed, even when the direction of rotation changes or oscillating movements are introduced into hollow shaft 2.7.

By suitable arrangement of the rotary encoder, as well as the use of the special evaluating logic, it is possible to provide a rotary encoder which is able to operate in energy-autonomous manner in emergency operation and is able to be equipped with only one pulse wire 1.1. This is considered to be a significant advantage, since such pulse wires 1.1 are comparatively expensive, so that a cost-effective type of construction is achievable hereby.

Figure 3A:
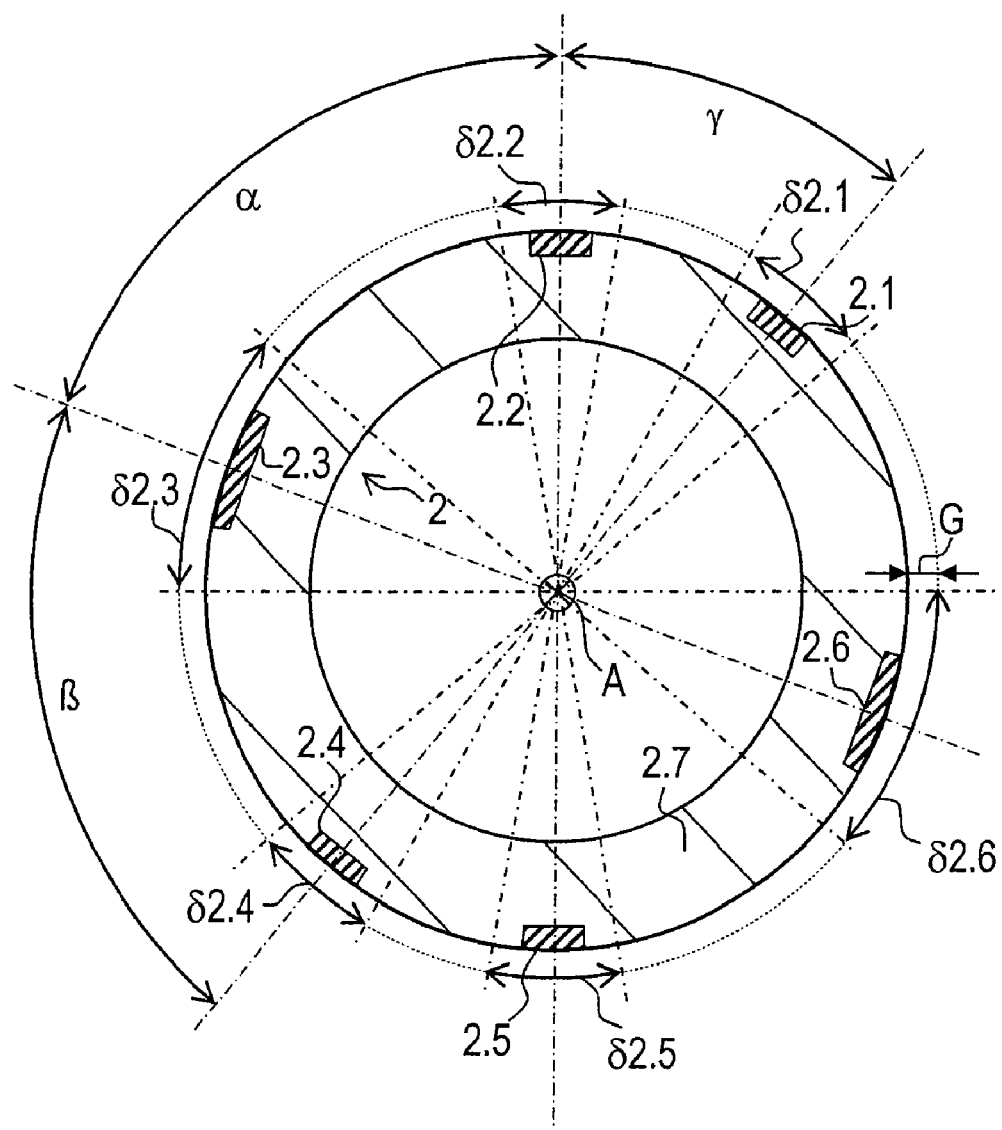
FIG. 3a is a cross-sectional view through a part of a rotary encoder according to an example embodiment of the present invention.
Figure 3B:
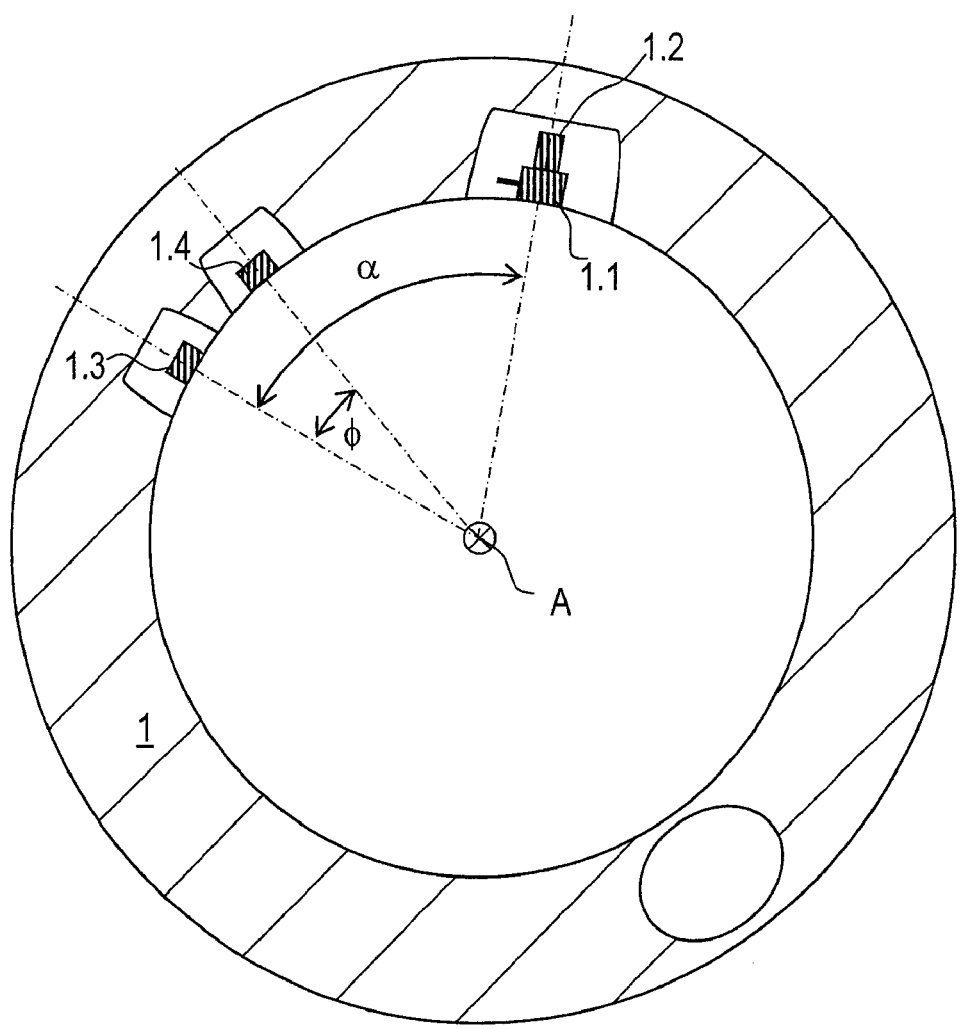
FIG. 3b is a cross-sectional view through a part of the rotary encoder.
Figure 3C:
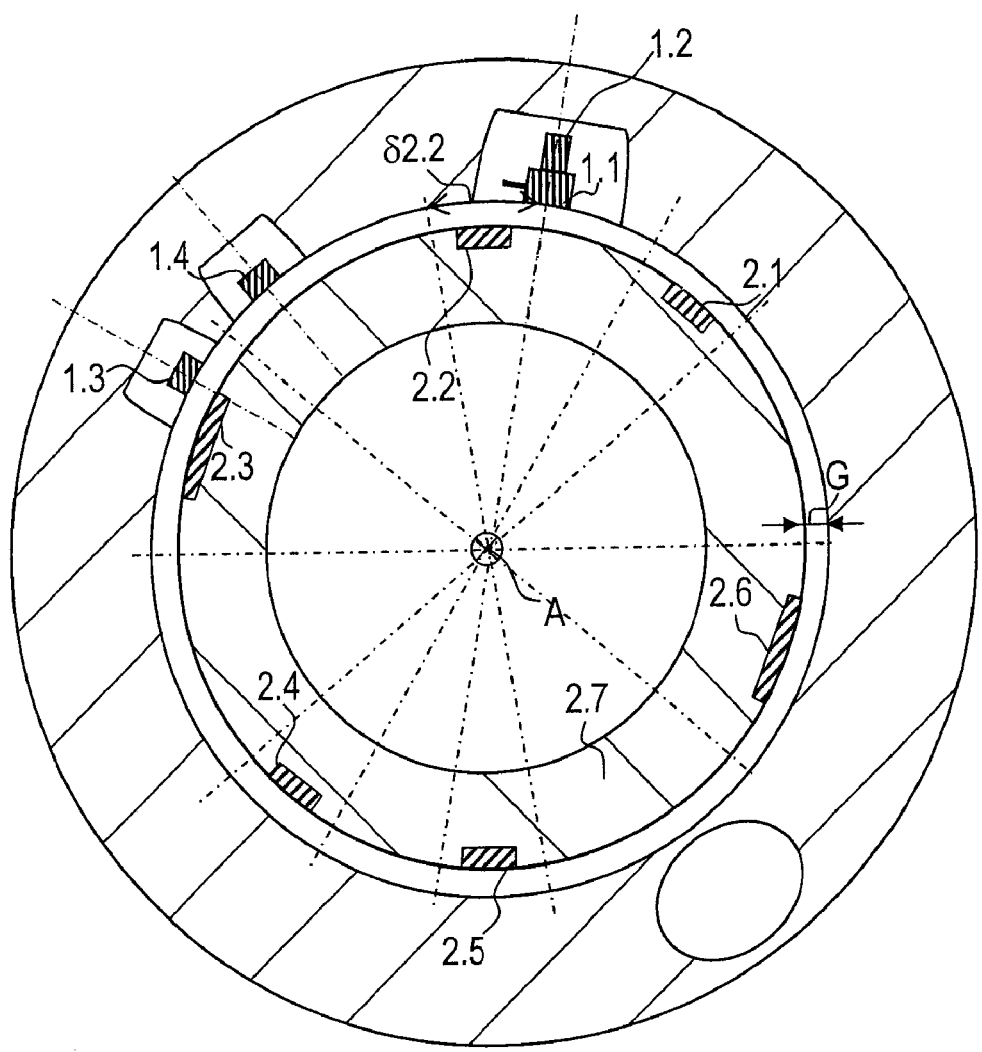
FIG. 3c is a cross-sectional view through a part of the rotary encoder.

FIGS. 3a to 3c illustrate an exemplary embodiment which differs from the above-described example essentially in that the positioning of passive magnets 2.1, 2.4, magnetic counters 2.2, 2.5, auxiliary magnets 2.3, 2.6 and pulse wire 1.1 relative to each other is different. In this manner, the robustness of the device with respect to dimensional tolerances, e.g., manufacturing tolerances, is increased. The following angle specifications are in each case rounded off to one decimal position. According to FIG. 3a, passive magnets 2.1, 2.4 are staggered by an angle γ of 47.4° in the circumferential direction relative to respective adjacent magnetic counter 2.2, 2.5. In determining angle γ, one starts in each case from the center line of the respective magnet. Magnetic counters 2.2, 2.5 are staggered by an angle α of 66.3° in the circumferential direction relative to respective adjacent auxiliary magnet 2.3, 2.6. In addition, auxiliary magnets 2.3, 2.6 are also staggered by an angle β of 66.3° relative to respective adjacent passive magnet 2.1 2.4.

According to FIG. 3b, pulse wire 1.1 is staggered by an angle α of 66.3° in the circumferential direction relative to one of MR elements 1.3. Situated between MR element 1.3 in question and pulse wire 1.1 is second MR element 1.4, which is staggered by an angle φ equal to 18.9° relative to the other MR element 1.3.

According to FIGS. 3a and 3c, passive magnets 2.1, 2.4, magnetic counters 2.2, 2.5 and auxiliary magnets 2.3, 2.6 have effective widths δ2.1, δ2.4, δ2.2, δ2.5, δ2.3, δ2.6. Effective widths δ2.1, δ2.4, δ2.2, δ2.5 amount to 18.9° in the exemplary embodiment illustrated, while effective widths δ2.3, δ2.6 of auxiliary magnets 2.3, 2.6 amount to 37.9°. In the assembled state, an air gap of size G exists between rotor 2 and stator 1.

As soon as the center line of MR elements 1.3, 1.4 is radially aligned with one of effective widths δ2.1, δ2.4, δ2.2, δ2.5, δ2.3, δ2.6 due to rotation of rotor 2, MR element 1.3, 1.4 in question reacts.

With regard to pulse wire 1.1 as well as magnetic counters 2.2, 2.5 and auxiliary magnets 2.3, 2.6, trigger areas T2.2, T2.5, T2.3, T2.6 may be defined (FIG. 4), within which a voltage pulse is able to be triggered by pulse wire 1.1. In particular, depending on the direction of rotation, voltage pulses are triggered at the borders of trigger areas T2.2, T2.5, T2.3, T2.6. In the exemplary embodiment illustrated, the rotary encoder is arranged such that trigger areas T2.2, T2.5, T2.3, T2.6 are exactly as large as corresponding effective widths δ2.2, δ2.5, δ2.3, δ2.6.

Figure 4:
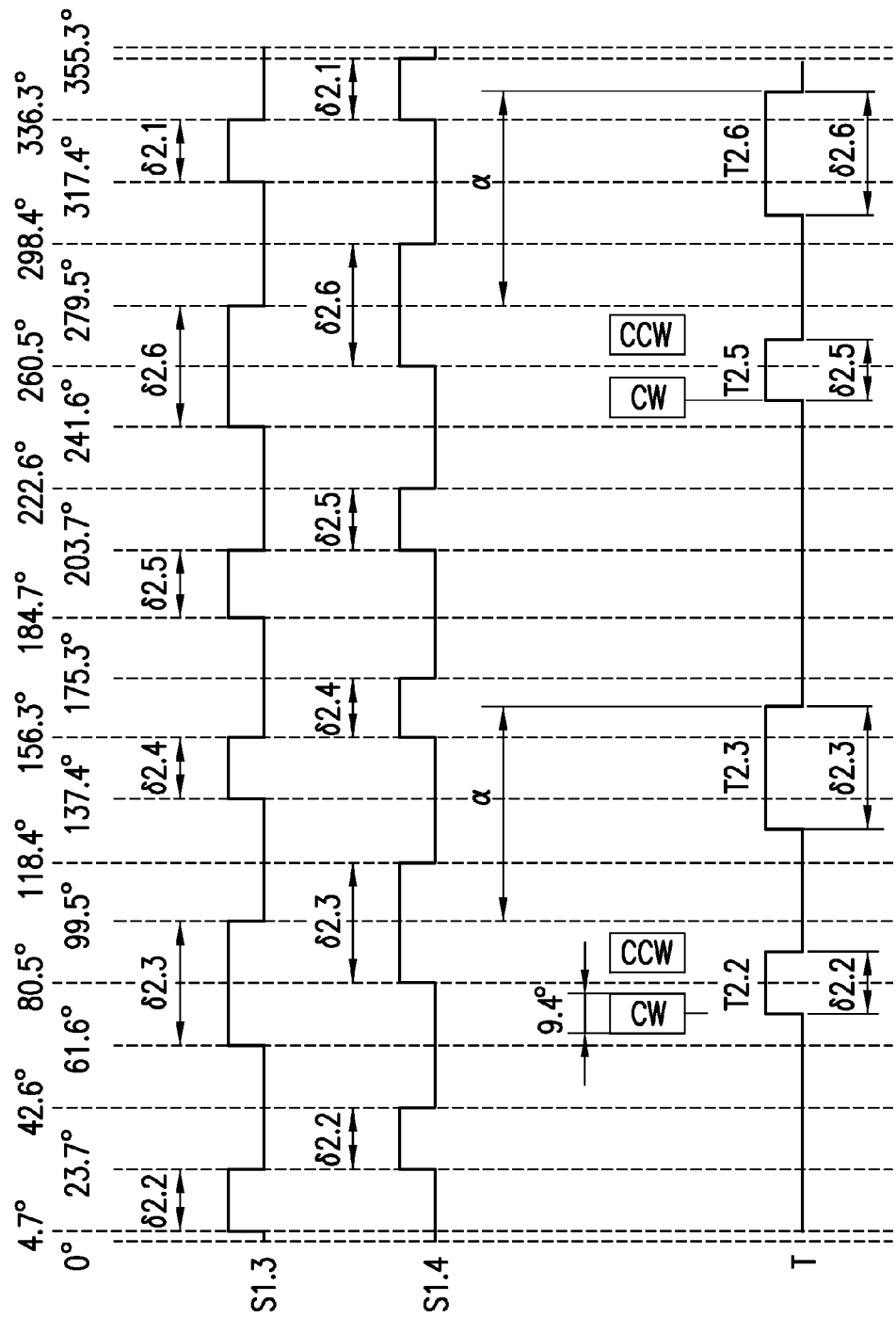
FIG. 4 illustrates signal patterns of the magnetic sensors and of the pulse wire.

FIG. 3c is a cross-sectional view through a rotary encoder whose rotor 2 is moving clockwise, so that the magnetic field of magnetic counter 2.2 triggers exactly one voltage pulse in pulse wire 1.1. At this instance, MR element 1.3 has precisely the state one, because it is located within effective width δ2.3. On the other hand, MR element 1.4 is in the state zero. In FIG. 4, the rotational position of rotor 2 is illustrated as a function of the states of MR elements 1.3, 1.4 and trigger state T, based on the voltage pulse. Therefore, the rotational position illustrated in FIG. 3c may be assigned to the angular value 71.1° in FIG. 4.

Due to the special configuration of passive magnets 2.1, 2.4, magnetic counters 2.2, 2.5 and auxiliary magnets 2.3, 2.6, as well as that of MR elements 1.3, 1.4 and of pulse wire 1.1, the edge of the voltage pulse lies with a distance of in each case ±4.7° exactly between the edges of signals S1.3 and S1.4. Thus, an extremely high reliability exists with respect to the detection of the rotational direction, because the rotary encoder correspondingly tolerates deviations of up to ±4.7°. The same observation also holds true for the remaining areas at which rotational angle is detected.

Rotary encoders having two passive magnets, magnetic counters and auxiliary magnets 2.1, 2.4; 2.2, 2.5; 2.3, 2.6, respectively, were described above. However, example embodiments of the present invention also provide rotary encoders having in each case more than two passive magnets, magnetic counters and auxiliary magnets 2.1, 2.4; 2.2, 2.5; 2.3, 2.6. For example, a configuration having in each case four passive magnets, magnetic counters and auxiliary magnets 2.1, 2.4; 2.2, 2.5; 2.3, 2.6 may be provided.

TABLE I

For determining the auxiliary-magnet edge state

| P | S1.3$_n$ | S1.4$_n$ | F1$_{n-1}$ | F2$_{n-1}$ | F1$_n$ | F2$_n$ |
|---|---|---|---|---|---|---|
| 0 | 0 | 0 | 0 | 0 | 1 | 0 |
| 0 | 0 | 0 | 0 | 1 | 0 | 1 |
| 0 | 0 | 0 | 1 | 0 | 1 | 0 |
| 0 | 0 | 0 | 1 | 1 | 1 | 0 |
| 0 | 0 | 1 | 0 | 0 | 0 | 1 |
| 0 | 0 | 1 | 0 | 1 | 0 | 1 |
| 0 | 0 | 1 | 1 | 0 | 1 | 0 |
| 0 | 0 | 1 | 1 | 1 | 0 | 1 |
| 0 | 1 | 0 | 0 | 0 | 0 | 0 |
| 0 | 1 | 0 | 0 | 1 | 0 | 1 |
| 0 | 1 | 0 | 1 | 0 | 1 | 0 |
| 0 | 1 | 0 | 1 | 1 | 0 | 0 |
| 0 | 1 | 1 | 0 | 0 | 0 | 0 |
| 0 | 1 | 1 | 0 | 1 | 0 | 1 |
| 0 | 1 | 1 | 1 | 0 | 1 | 0 |
| 0 | 1 | 1 | 1 | 1 | 1 | 0 |
| 1 | 0 | 0 | 0 | 0 | 1 | 0 |
| 1 | 0 | 0 | 0 | 1 | 0 | 0 |
| 1 | 0 | 0 | 1 | 0 | 0 | 0 |
| 1 | 0 | 0 | 1 | 1 | 0 | 0 |
| 1 | 0 | 1 | 0 | 0 | 0 | 1 |
| 1 | 0 | 1 | 0 | 1 | 0 | 1 |
| 1 | 0 | 1 | 1 | 0 | 0 | 0 |
| 1 | 0 | 1 | 1 | 1 | 0 | 0 |
| 1 | 1 | 0 | 0 | 0 | 0 | 0 |
| 1 | 1 | 0 | 0 | 1 | 0 | 0 |
| 1 | 1 | 0 | 1 | 0 | 0 | 0 |
| 1 | 1 | 0 | 1 | 1 | 0 | 0 |
| 1 | 1 | 1 | 0 | 0 | 0 | 0 |
| 1 | 1 | 1 | 0 | 1 | 0 | 0 |
| 1 | 1 | 1 | 1 | 0 | 0 | 0 |
| 1 | 1 | 1 | 1 | 1 | 0 | 0 |

P Counting pulse
n Number of voltage pulses triggered by the pulse wire
S1.3 State of magnetic sensor 1.3 upon the n-th voltage pulse
S1.4 State of magnetic sensor 1.4 upon the n-th voltage pulse
F1$_{n-1}$ First value of the auxiliary-magnet edge state upon the (n – 1)-th voltage pulse
F2$_{n-1}$ Second value of the auxiliary-magnet edge state upon the (n – 1)-th voltage pulse
F1$_n$ First value of the auxiliary-magnet edge state upon the n-th voltage pulse
F2$_n$ Second value of the auxiliary-magnet edge state upon the n-th voltage pulse

TABLE II

For determining the magnetic-counter edge state

| S1.3$_n$ | S1.4$_n$ | Z1$_{n-1}$ | Z2$_{n-1}$ | Z1$_n$ | Z2$_n$ |
|---|---|---|---|---|---|
| 0 | 0 | 0 | 0 | 0 | 0 |
| 0 | 0 | 0 | 1 | 0 | 1 |
| 0 | 0 | 1 | 0 | 1 | 0 |
| 0 | 0 | 1 | 1 | 0 | 0 |
| 0 | 1 | 0 | 0 | 0 | 0 |
| 0 | 1 | 0 | 1 | 0 | 1 |
| 0 | 1 | 1 | 0 | 1 | 0 |
| 0 | 1 | 1 | 1 | 0 | 0 |
| 1 | 0 | 0 | 0 | 1 | 0 |
| 1 | 0 | 0 | 1 | 1 | 0 |
| 1 | 0 | 1 | 0 | 1 | 0 |
| 1 | 0 | 1 | 1 | 1 | 0 |
| 1 | 1 | 0 | 0 | 0 | 0 |
| 1 | 1 | 0 | 1 | 0 | 1 |
| 1 | 1 | 1 | 0 | 0 | 1 |
| 1 | 1 | 1 | 1 | 0 | 1 | n Number of voltage pulses triggered by the pulse wire
S1.3 State of magnetic sensor 1.3 upon the n-th voltage pulse
S1.4 State of magnetic sensor 1.4 upon the n-th voltage pulse
Z1$_{n-1}$ First value of the magnetic-counter edge state upon the (n – 1)-th voltage pulse
Z2$_{n-1}$ Second value of the magnetic-counter edge state upon the (n – 1)-th voltage pulse
Z1$_n$ First value of the magnetic-counter edge state upon the n-th voltage pulse
Z2$_n$ Second value of the magnetic-counter edge state upon the n-th voltage pulse

TABLE III

| S1.3$_n$ | S1.4$_n$ | Z1$_{n-1}$ | Z2$_{n-1}$ | F1$_{n-1}$ | F2$_{n-1}$ | R | P |
|---|---|---|---|---|---|---|---|
| 0 | 0 | 0 | 0 | 0 | 0 | / | / |
| 0 | 0 | 0 | 0 | 0 | 1 | / | / |
| 0 | 0 | 0 | 0 | 1 | 0 | / | / |
| 0 | 0 | 0 | 0 | 1 | 1 | / | / |
| 0 | 0 | 0 | 1 | 0 | 0 | cw | 1 |
| 0 | 0 | 0 | 1 | 0 | 1 | / | 0 |
| 0 | 0 | 0 | 1 | 1 | 0 | / | / |
| 0 | 0 | 0 | 1 | 1 | 1 | / | / |
| 0 | 0 | 1 | 0 | 0 | 0 | / | 0 |
| 0 | 0 | 1 | 0 | 0 | 1 | / | 0 |
| 0 | 0 | 1 | 0 | 1 | 0 | / | 0 |
| 0 | 0 | 1 | 0 | 1 | 1 | / | / |
| 0 | 0 | 1 | 1 | 0 | 0 | / | / |
| 0 | 0 | 1 | 1 | 0 | 1 | / | / |
| 0 | 0 | 1 | 1 | 1 | 0 | / | / |
| 0 | 0 | 1 | 1 | 1 | 1 | / | / |
| 0 | 1 | 0 | 0 | 0 | 0 | / | / |
| 0 | 1 | 0 | 0 | 0 | 1 | / | / |
| 0 | 1 | 0 | 0 | 1 | 0 | / | / |
| 0 | 1 | 0 | 0 | 1 | 1 | / | / |
| 0 | 1 | 0 | 1 | 0 | 0 | / | 0 |
| 0 | 1 | 0 | 1 | 0 | 1 | / | 0 |
| 0 | 1 | 0 | 1 | 1 | 0 | / | 0 |
| 0 | 1 | 0 | 1 | 1 | 1 | / | / |
| 0 | 1 | 1 | 0 | 0 | 0 | ccw | 1 |
| 0 | 1 | 1 | 0 | 0 | 1 | / | 0 |
| 0 | 1 | 1 | 0 | 1 | 0 | / | 0 |
| 0 | 1 | 1 | 0 | 1 | 1 | / | / |
| 0 | 1 | 1 | 1 | 0 | 0 | / | / |
| 0 | 1 | 1 | 1 | 0 | 1 | / | / |
| 0 | 1 | 1 | 1 | 1 | 0 | / | / |
| 0 | 1 | 1 | 1 | 1 | 1 | / | / |
| 1 | 0 | 0 | 0 | 0 | 0 | / | / |
| 1 | 0 | 0 | 0 | 0 | 1 | / | / |
| 1 | 0 | 0 | 0 | 1 | 0 | / | / |
| 1 | 0 | 0 | 0 | 1 | 1 | / | / |
| 1 | 0 | 0 | 1 | 0 | 0 | cw | 1 |
| 1 | 0 | 0 | 1 | 0 | 1 | cw | 1 |
| 1 | 0 | 0 | 1 | 1 | 0 | cw | 1 |
| 1 | 0 | 0 | 1 | 1 | 1 | / | / |
| 1 | 0 | 1 | 0 | 0 | 0 | / | 0 |
| 1 | 0 | 1 | 0 | 0 | 1 | cw | 1 |
| 1 | 0 | 1 | 0 | 1 | 0 | cw | 1 |
| 1 | 0 | 1 | 0 | 1 | 1 | / | / |
| 1 | 0 | 1 | 1 | 0 | 0 | / | / |
| 1 | 0 | 1 | 1 | 0 | 1 | / | / |
| 1 | 0 | 1 | 1 | 1 | 0 | / | / |
| 1 | 0 | 1 | 1 | 1 | 1 | / | / |
| 1 | 1 | 0 | 0 | 0 | 0 | / | / |
| 1 | 1 | 0 | 0 | 0 | 1 | / | / |
| 1 | 1 | 0 | 0 | 1 | 0 | / | / |
| 1 | 1 | 0 | 0 | 1 | 1 | / | / |
| 1 | 1 | 0 | 1 | 0 | 0 | / | 0 |
| 1 | 1 | 0 | 1 | 0 | 1 | ccw | 1 |
| 1 | 1 | 0 | 1 | 1 | 0 | ccw | 1 |
| 1 | 1 | 0 | 1 | 1 | 1 | / | / |
| 1 | 1 | 1 | 0 | 0 | 0 | ccw | 1 |
| 1 | 1 | 1 | 0 | 0 | 1 | ccw | 1 |
| 1 | 1 | 1 | 0 | 1 | 0 | ccw | 1 |
| 1 | 1 | 1 | 0 | 1 | 1 | / | / |
| 1 | 1 | 1 | 1 | 0 | 0 | / | / |
| 1 | 1 | 1 | 1 | 0 | 1 | / | / |
| 1 | 1 | 1 | 1 | 1 | 0 | / | / |
| 1 | 1 | 1 | 1 | 1 | 1 | / | / | n Number of voltage pulses triggered by the pulse wire
S1.3 State of magnetic sensor 1.3 upon the n-th voltage pulse
S1.4 State of magnetic sensor 1.4 upon the n-th voltage pulse
F1$_{n-1}$ First value of the auxiliary-magnet edge state upon the (n – 1)-th voltage pulse
F2$_{n-1}$ Second value of the auxiliary-magnet edge state upon the (n – 1)-th voltage pulse
Z1$_{n-1}$ First value of the magnetic-counter edge state upon the (n – 1)-th voltage pulse
Z2$_{n-1}$ Second value of the magnetic-counter edge state upon the (n – 1)-th voltage pulse
R Direction of rotation (cw clockwise; ccw counter-clockwise)
P Counting pulse

What is claimed is:
1. A rotary encoder, comprising:
a first component group; and
a second component group;
wherein the first component group and the second component group are rotatable relative to each other about an axis;

wherein the first component group includes a trigger sensor and a plurality of magnetic sensors staggered in a circumferential direction relative to the axis;

wherein the second component group includes a first magnet, a second magnet, and a third magnet;

wherein the magnetic sensors are configured to detect a magnetic field of the first magnet and of the third magnet in response to a relative rotation of the component groups by at least one full revolution; and wherein the trigger sensor is configured to generate a trigger signal by the second magnet, by the third magnet, and not by the first magnet.

2. The rotary encoder according to claim 1, wherein the magnetic sensors are omnipolar-sensitive.

3. The rotary encoder according to claim 1, wherein the trigger sensor includes a pulse wire and a reset magnet, the reset magnet oriented to have a directional component parallel to a longitudinal extension of the pulse wire, the pulse wire configured to generate a voltage pulse as the trigger signal due to the second magnet, due to the third magnet, and not due to the first magnet.

4. The rotary encoder according to claim 3, wherein the pulse wire is arranged with a directional component parallel to the axis.

5. The rotary encoder according to claim 1, wherein polar alignments of the reset magnet and the first magnet are oriented in parallel.

6. The rotary encoder according to claim 1, wherein the magnetic sensors are arranged as at least one of (a) MR elements and (b) Hall elements.

7. The rotary encoder according to claim 1, wherein polar alignments of the second magnet and the third magnet are oriented with a directional component parallel to the axis, and a polar alignment of the first magnet is oriented with a directional component antiparallel to the axis.

8. The rotary encoder according to claim 1, wherein the second component group includes a hollow shaft.

9. The rotary encoder according to claim 1, further comprising:
 a non-volatile memory element configured to store four edge states and a counter content; and
 an electronic circuit configured to read from the memory unit the edge states in response to a later occurrence of a trigger signal, to determine a direction of rotation of the component groups relative to each other, and to generate a count pulse;
 wherein the memory element is configured to store a change in the count based on the direction of rotation and an occurrence of count pulse.

10. The rotary encoder according to claim 1, wherein the electronic circuit includes at least one of (a) an integrated circuit and (b) an ASIC module.

11. The rotary encoder according to claim 1, wherein the third magnet has a larger effective width than an effective width of at least one of (a) the first magnet and (b) the second magnet.

12. The rotary encoder according to claim 1, wherein borders of trigger areas are staggered with respect to edges of states of the magnetic sensors.

13. The rotary encoder according to claim 1, wherein at least one of (a) an effective width of the second magnet is as large as a trigger area of the second magnet and (b) an effective width of the third magnet is as large as a trigger area of the third magnet.

14. The rotary encoder according to claim 1, wherein the first magnet is staggered by a first angle in the circumferential direction relative to the second magnet, and the second magnet is staggered by a second angle in the circumferential direction relative to the third magnet, the first angle and the second angle being different.

15. The rotary encoder according to claim 14, wherein, in response to a relative rotation of the two component groups by one full revolution without overlap of a starting point and an end point, j counting pulses are generatable; and
 wherein the first angle amounts to one of (a) $95°/j\pm20°/j$ and (b) $360°/j-95°/j\pm20°/j$ and the second angle amounts to one of (a) $133°/j\pm20°/j$ and (b) $360°/j-133°/j\pm20°/j$.

16. The rotary encoder according to claim 1, wherein the trigger sensor is staggered by an angle of one of (a) $133°/j\pm20°/j$ and (b) $360°/j-133°/j\pm20°/j$ in the circumferential direction relative to one of the magnetic sensors.

17. The rotary encoder according to claim 1, wherein the magnetic sensors are staggered by an angle of one of (a) $(38°\pm10°)/j$ and (b) $360°/j-(38°\pm10°)/j$ in the circumferential direction.

18. A method for operating a rotary encoder that includes a first component group and a second component group, the first component group and the second component group rotatable relative to each other about an axis, the first component group including a trigger sensor and a plurality of magnetic sensors staggered in a circumferential direction relative to the axis, the second component group including a first magnet, a second magnet, and a third magnet, comprising:
 detecting a magnetic field of the first magnet and the third magnet by the magnetic sensors in response to a relative rotation of the component groups by at least one full revolution;
 generating a trigger signal by the trigger sensor due to the second magnet, due to the third magnet, and not due to the first magnet.

19. The method according to claim 18, wherein a non-volatile memory element stores four edge states and a counter content, the method further comprising:
 reading out the edge states from the memory element in response to a later occurrence of a trigger signal;
 based on the reading out, determining, by an electronic circuit, a direction of rotation of the component groups relative to each other; and
 generating a counting pulse in the electronic circuit to store in the memory element a change in the counter content based on the direction of rotation and the counting pulse.

20. The method according to claim 18, further comprising generating at least one of (a) two and (b) four counting pulses in response to a relative rotation of the two components by one revolution without overlap of a starting point and an end point.

21. The method according to claim 18, wherein the trigger sensor includes a pulse wire and a reset magnet, the reset magnet oriented to have a directional component parallel to a longitudinal extension of the pulse wire, the method further comprising generating a voltage pulse by the pulse wire due to the second magnet, due to the third magnet, and not due to the first magnet.

22. The method according to claim 21, further comprising using energy content of the voltage pulse to generate a counting pulse and to store a counter content in a non-volatile memory element.

* * * * *